Patented May 9, 1933

1,908,545

UNITED STATES PATENT OFFICE

JAMES W. SCHWAB AND CARL E. BUTTERWORTH, OF GULF, TEXAS, ASSIGNORS, BY MESNE ASSIGNMENTS, TO THE KOPPERS COMPANY OF DELAWARE, A CORPORATION OF DELAWARE

PURIFICATION OF WATER

No Drawing. Application filed November 6, 1928. Serial No. 317,685.

This invention relates to the purification of water and has for an object the provision of an improved method of treating water containing contaminating substances in solution. More particularly, the invention contemplates the provision of an improved method of treating industrial waste water, such, for example, as water containing soluble sulphides.

The disposal of waste water in many industries presents a perplexing problem. Such waters, in many instances, contain impurities which make them obnoxious when they are wasted in the usual manner, by permitting them to flow into natural streams. In some instances, these waters contain soluble sulphides which break down, upon exposure to the atmosphere, or as a result of chemical action with mineral salts contained in ditches or stream beds, to form toxic and foul smelling gases such as hydrogen sulphide. Such gases are, of course injurious to the health and offensive to the senses of residents of adjacents of adjacent communities. It is therefore desirable to eliminate, if possible, the source of such annoyance. In many communities, statutes or ordinances compel manufacturers or operators to purify waste waters before allowing them to flow into natural streams.

The present invention provides a method by means of which industrial waste water may be quickly and satisfactorily freed of objectionable contaminants. The improved method of the invention involves aeration of the water for the conversion of contaminants to such forms that they may be removed or to such forms that their presence in the water is not objectionable.

In one of its aspects, the invention involves aeration alone when circumstances will permit. In another aspect, the invention contemplates the utilization of certain control steps, in conjunction with aeration, whereby the required period of aeration is greatly reduced, and/or whereby the evolution of obnoxious products may be avoided.

We have discovered that by aerating waste waters containing soluble sulphides these objectionable substances may be removed or converted to such form that the waters may be subsequently wasted by permitting them to flow into natural streams without producing objectionable results. We have also discovered that through control of the hydrogen ion concentration, in processes involving chemical reactions, for the purpose of changing the chemical structures of contaminants, the process of treatment may be so controlled that markedly improved results may be obtained. We have also discovered that in carrying out processes for the purification of water involving chemical changes, improved results are obtained when certain catalytic agents are used. We have further discovered that by aerating industrial waste waters in the presence of a catalyst, with an adjusted hydrogen ion concentration, highly desirable results may be obtained.

In treating water containing soluble sulphides according to the method of our invention, using the aeration step alone, soluble sulphides may be substantially completely eliminated, but considerable quantities of hydrogen sulphide are produced and pass out of solution into the atmosphere. The required period of aeration will vary with the amount of soluble sulphides present in the water undergoing treatment, and its hydrogen ion concentration.

If hydrogen ion control is used in conjunction with aeration, the period of aeration and the quantity of hydrogen sulphide evolved may be varied. Thus, when treating industrial waste water containing soluble sulphides and having a hydrogen ion concentration similar to that of pure water, if the hydrogen ion concentration is increased, the length of time required for aeration is decreased and the amount of hydrogen sulphide evolved is increased, while, if the hydrogen ion concentration is decreased the length of time required for aeration is increased and the amount of hydrogen sulphide evolved is decreased.

We have found that ordinary commercial reagents such, for example, as sulphuric acid ($H_2SO_4$) and calcium hydroxide ($Ca(OH)_2$) may be used advantageously in adjusting the hydrogen ion concentration.

When water containing soluble sulphides is aerated in the presence of a catalyst, the length of time required for aeration is decreased and the amount of hydrogen sulphide evolved is decreased. In such cases, the results obtained are dependent to some extent upon the type of catalyst used. We have found that very good results may be obtained when a soluble salt of nickel is added to the water before aeration, and that better results are obtained when a small amount of a soluble copper salt or a soluble lead salt is added with the nickel salt. Other catalytic agents which may be used instead of nickel but less effectively are soluble manganese and cobalt salts.

When treating water, containing soluble sulphides and having a hydrogen ion concentration similar to that of pure water, by aerating in the presence of a catalyst, an increase in hydrogen ion concentration results in an increase in the quantity of hydrogen sulphide evolved and a decrease in the time required for aeration, while a decrease in the hydrogen ion concentration results in an increase in the time required for aeration and a decrease in the quantity of hydrogen sulphide evolved.

The results achieved in utilizing hydrogen ion control in conjunction with aeration are much superior to those achieved when aeration alone is practiced. The results achieved in aerating in the presence of a catalyst without utilizing hydrogen ion control are superior to those obtained when hydrogen ion control is utilized in conjunction with aeration without the use of a catalyst. For most practical purposes, the complete process of the invention involving aeration in the presence of one or more catalytic agents and utilizing hydrogen ion control, produces the best results. In practicing the invention, we have found that the best results are obtained when small amounts of nickel sulphate and copper sulphate are added to the water before aeration.

A process involving aeration alone usually requires several hours for the complete elimination of soluble sulphides, and causes the evolution of considerable quantities of hydrogen sulphide. The complete process of the invention and various combinations of the several steps of the complete process may be carried out in such a manner as to reduce the time required for aeration to relatively short periods, and to limit the evolution of hydrogen sulphide to any desired relatively small amount.

In the practice of the invention, we have found that lead and silver salts have marked beneficial effects with the nickel salt. Lead salt is slightly less effective than copper salt considerably more effective than silver. The particular form of the invention which it will be desirable to practice, in any instance will depend upon many factors such, for instance, as the quantity of water to be treated, available time, quantity of contaminants in the water, and location of the treating plant, in connection with issuance of hydrogen sulphide gas into the atmosphere.

"Bleed-water" which occurs as a waste product in the production of sulphur from underground deposits by the Frasch process, may be cited as a type of industrial waste water to the treatment of which the method of the present invention is particularly adapted.

This waste or "bleed-water" which is discharged from the "bleed" wells is free from suspended solids and is yellow in color. On coming into contact with the air, sulphur is precipitated and, as the water flows to waste through ditches, soluble sulphides present react with metal salts in the soil to form colloidal sulphides, which give the water a dark color. Hydrogen sulphide is given off by the water as it comes from the well and for long periods of time thereafter. "Bleed-water" also contains, in solution, the salts of alkali and alkali-earth metals, such as calcium, magnesium and sodium which are usually found in natural waters. "Bleed-water" has a hydrogen ion concentration corresponding to a pH value of about 7.2, and it may contain from about 12 to 20 grains per gallon of sulphides and partly oxidized sulphur compounds.

In treating this water according to the method of our invention, we have found that it can be freed from soluble sulphides by bubbling air in finely divided form through it for a period of from three to four hours. This treatment results in the evolution of considerable quantities of hydrogen sulphide, and in the precipitation of elemental sulphur. Partly oxidized sulphur compounds, such as thio-sulphates are also formed.

While the results of this treatment are entirely satisfactory insofar as the removal of soluble sulphides is concerned, the time required makes it undesirable for use on a large scale where it is necessary to treat large volumes of water. This particular method may also have another objectionable feature, in that considerable quantities of hydrogen sulphide are liberated, at the place of treatment. In many instances this might not be an objectionable feature, but in certain instances, such as for instance, when a treating plant is located in the neighborhood of a municipality, the liberation of hydrogen sulphide might be objectionable.

When the liberation of considerable quantities of hydrogen sulphide at the place of treatment is not an objectionable feature, and it is desirable to decrease the period of aeration, it may be advisable to increase the hydrogen ion concentration. We have found that when the hydrogen ion concentration is maintained at a pH value of from 4 to 5, a period of aeration of from 3 to 5 minutes results in a complete removal of all of the soluble sulphides. We have also found that the period of aeration may be reduced to from 20 to 30 minutes with complete removal of the soluble sulphides when about 10 parts per million of nickel sulphate ($NiSO_4 \cdot 6H_2O$) is added to the water before aeration. When nickel sulphate is added in the proportions noted above, and a hydrogen ion concentration corresponding to a pH value of about 10.6 is maintained, a period of aeration of about 90 minutes effects a complete removal of soluble sulphides without the evolution of hydrogen sulphide. This latter method may be advantageously used when it is desirable to avoid the evolution of hydrogen sulphide and when the time required for the completion of the the process is not material.

Aeration of "bleed" water to which 10 parts per million of nickel sulphate and 2.5 parts per million of copper sulphate have been added, and the hydrogen ion concentration of which has been adjusted to correspond to a pH value of about 9.6 results in the complete elimination of soluble sulphides in about 25 minutes with the evolution of an amount of hydrogen sulphide equivalent to only 0.12 grains per gallon of solution.

The catalytic action of the various agents is not thoroughly understood, but it is more than probable that the nickel sulphate which is added changes to another form before it acts in its catalytic capacity. It is entirely possible that the catalytic agent is a nickel sulphide or a transition product intermediate between nickel sulphate and nickel sulphide. Where two agents in the nature of nickel sulphate and copper sulphate are added together, it is probable that they do not act independently as separate catalysts, but rather that the beneficial catalytic effect is produced by a chemical combination during the transition period and the resulting product or products act as the catalyst.

The following tables illustrate the results of our investigations in connection with the treatment of "bleed-water" and indicate some of the various procedures which may be followed in practicing the invention.

Table No. I shows results obtained in aerating untreated "bleed-water" of normal and adjusted hydrogen ion concentration.

Table No. II shows results obtained in aerating "bleed-water", of normal and adjusted hydrogen ion concentration, to which about 10 parts per million of nickel sulphate were added before aeration.

Table No. III shows results obtained in aerating "bleed-water" of normal and adjusted hydrogen ion concentrations, to which about 10 parts per million of nickel sulphate and about 2.5 parts per million of copper sulphate were added before aeration.

Table No. IV shows results obtained in aerating "bleed-water" of normal and adjusted hydrogen ion concentrations, to which about 10 parts per million of nickel sulphate and about 10 parts per million of lead acetate were added before aeration.

Table No. I

| pH value | Length of time water was aerated— minutes | Hydrogen sulphide liberated as grains sulphide per gallon of water | Grains soluble sulphide left in one gallon water after aeration |
|---|---|---|---|
| 4.0 | 3 | 7.59 | None |
| 4.5 | 3 | 6.22 | None |
| 5.0 | 5 | 6.83 | None |
| 5.5 | 20 | 5.78 | 0.07 |
| 6.1 | 30 | 5.74 | 0.07 |
| 6.5 | 40 | 5.40 | 0.07 |
| 6.6 | 40 | 5.54 | 0.07 |
| 6.8 | 60 | 5.67 | 0.07 |
| 6.8 | 180 | 5.38 | 0.04 |
| 7.2 | 210 | 3.67 | 0.04 |
| 7.2 | 240 | 5.42 | 0.07 |
| 7.8 | 300 | 4.80 | 0.04 |
| 8.2 | 360 | 4.87 | 0.10 |
| 9.6 | 360 | 5.26 | 0.07 |
| 10.4 | 360 | 4.98 | 0.07 |
| 10.6 | 360 | 4.22 | 0.07 |
| 10.7 | 360 | 4.00 | 0.10 |
| 11.0 | 360 | 3.31 | 0.14 |

Table No. II

| pH value | Length of time water was aerated— minutes | Hydrogen sulphide liberated as grains sulphide per gallon of water | Grains soluble sulphide left in one gallon water after aeration |
|---|---|---|---|
| 4.0 | 3 | 7.48 | None |
| 4.5 | 3 | 6.00 | None |
| 5.0 | 3 | 6.22 | None |
| 5.5 | 4 | 5.78 | None |
| 6.1 | 4 | 5.08 | None |
| 6.5 | 5 | 4.92 | None |
| 6.6 | 9 | 4.64 | None |
| 6.8 | 15 | 5.28 | None |
| 6.8 | 20 | 4.07 | None |
| 7.2 | 20 | 3.49 | None |
| 7.2 | 30 | 3.93 | None |
| 7.8 | 30 | 1.13 | None |
| 8.2 | 40 | 0.88 | None |
| 8.5 | 40 | 0.66 | 0.07 |
| 8.8 | 45 | 0.41 | 0.10 |
| 9.0 | 60 | 0.29 | 0.11 |
| 9.6 | 75 | 0.15 | None |
| 10.4 | 85 | 0.04 | None |
| 10.6 | 90 | None | None |
| 10.7 | 105 | None | 0.04 |
| 11.0 | 120 | None | 0.07 |

Table No. III

| pH value | Length of time water was aerated—minutes | Hydrogen sulphide liberated as grains sulphide per gallon of water | Grains soluble sulphide left in one gallon water after aeration |
|---|---|---|---|
| 4.0 | 3 | 7.64 | None |
| 4.5 | 3 | 7.30 | None |
| 5.0 | 3 | 5.56 | None |
| 5.5 | 4 | 5.78 | None |
| 6.1 | 4 | 4.98 | None |
| 6.3 | 7 | 4.42 | None |
| 6.4 | 9 | 5.48 | None |
| 6.4 | 10 | 4.58 | None |
| 6.6 | 12 | 4.43 | None |
| 7.2 | 15 | 4.03 | None |
| 7.2 | 20 | 3.92 | None |
| 7.8 | 20 | 0.98 | None |
| 8.2 | 20 | 1.13 | None |
| 8.5 | 20 | 0.75 | None |
| 8.8 | 25 | 0.35 | None |
| 9.0 | 25 | 0.31 | None |
| 9.6 | 25 | 0.12 | None |
| 10.4 | 25 | 0.04 | None |
| 10.6 | 40 | 0.04 | None |
| 10.7 | 50 | None | None |
| 11.0 | 60 | None | None |

Table No. IV

| pH value | Length of time water was aerated—minutes | Hydrogen sulphide liberated as grains sulphide per gallon of water | Grains soluble sulphide left in one gallon water after aeration |
|---|---|---|---|
| 4.0 | 2 | 7.39 | None |
| 4.5 | 2 | 8.26 | None |
| 5.0 | 3 | 6.98 | None |
| 5.5 | 3 | 6.36 | None |
| 6.1 | 3 | 5.48 | None |
| 6.3 | 4 | 4.95 | None |
| 6.6 | 4 | 5.02 | None |
| 6.6 | 8 | 4.40 | None |
| 6.8 | 8 | 4.18 | None |
| 7.2 | 8 | 2.49 | None |
| 7.2 | 8 | 2.49 | None |
| 7.6 | 10 | 1.28 | None |
| 8.2 | 10 | 0.66 | None |
| 8.5 | 15 | 0.50 | None |
| 8.8 | 18 | 0.28 | None |
| 9.2 | 18 | 0.09 | None |
| 9.6 | 20 | 0.09 | None |
| 10.4 | 20 | None | None |
| 10.6 | 50 | None | None |
| 10.7 | 120 | None | None |

We prefer to use sulphuric acid and calcium hydroxide in adjusting the hydrogen ion concentration, but any of the usual acids or bases may be used advantageously. In carrying out the process with the addition of a metal salt such as nickel sulphate, the metal salt may be introduced before or after the introduction of the agent for adjusting hydrogen ion concentration. However, we prefer to introduce the metal salt before introducing the alkaline agent for the purpose of decreasing the hydrogen ion concentration.

"Bleed-water", after treatment, may be turbid. At higher hydrogen iron concentrations, the turbidity results largely from precipitated sulphur. As the hydrogen ion concentration is decreased, calcium carbonate and magnesium hydroxide may be precipitated with the sulphur.

The water may be clarified, if desired, by any of several methods. On standing, the greater bulk of the suspended solids settle slowly. Customary coagulants may be used to accelerate settling. We have found that alum may be advantageously used to accelerate the settling of solids precipitated at higher hydrogen ion concentrations, and that ferrous sulphate may be advantageously used to accelerate settling of solids precipitated at the lower hydrogen ion concentrations. Filtering may be employed to produce a crystal clear water.

We have also found it to be advantageous to return a quantity of the settled sludge to the incoming waters. The sludge appears to have a beneficial effect upon the reaction taking place during aeration. It is quite possible that the beneficial effect may be attributed to the presence therein of nickel salts or salts of other metals added during the course of the original treatment.

We claim:

1. The method of purifying water containing a soluble sulphide which comprises adding a nickel salt and a copper salt, adjusting the hydrogen ion concentration, and aerating the mixture.

2. The method of purifying water containing a soluble sulphide which comprises adding nickel sulphate and copper sulphate, adjusting the hydrogen ion concentration, and aerating the mixture.

3. The method of purifying water containing a soluble sulphide which comprises adding substantially 10 parts per million of nickel sulphate and substantially 2½ parts per million of copper sulphate, adjusting the hydrogen ion concentration, and aerating the mixture.

In testimony whereof we affix our signatures.

JAMES W. SCHWAB.
CARL E. BUTTERWORTH.